(12) United States Patent
Hiraoka (10) Patent No.: US 7,258,332 B2
(45) Date of Patent: Aug. 21, 2007

(54) HYDRAULIC ANTIVIBRATION DEVICE

(75) Inventor: Takanori Hiraoka, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 226 days.

(21) Appl. No.: 11/076,062

(22) Filed: Mar. 10, 2005

(65) Prior Publication Data

US 2005/0200060 A1   Sep. 15, 2005

(30) Foreign Application Priority Data

Mar. 12, 2004  (WO) ................ PCT/JP2004/003366
Jan. 27, 2005  (JP)  ............................. 2005-020440

(51) Int. Cl.
   *F16F 5/00* (2006.01)
(52) U.S. Cl. ............................................. 267/140.13
(58) Field of Classification Search ........... 267/140.13, 267/140.14, 140.15; 248/562, 636
See application file for complete search history.

(56) References Cited

U.S. PATENT DOCUMENTS

| | | | |
|---|---|---|---|
| 4,711,206 A * | 12/1987 | Andra et al. ........... | 267/140.13 |
| 4,726,573 A * | 2/1988 | Hamaekers et al. ... | 267/140.13 |
| 4,738,435 A * | 4/1988 | Flower et al. ......... | 267/140.13 |
| 5,104,100 A | 4/1992 | Simuttis | |
| 5,240,233 A | 8/1993 | Kato et al. | |
| 5,443,245 A | 8/1995 | Bellamy et al. | |
| 2002/0043748 A1 | 4/2002 | Meyer | |
| 2006/0157902 A1* | 7/2006 | Sakata ................... | 267/140.13 |

FOREIGN PATENT DOCUMENTS

| | | |
|---|---|---|
| EP | 0 426 940 A1 | 5/1991 |
| EP | 0 596 787 A1 | 5/1994 |
| JP | 64-36737 | 3/1989 |
| JP | 1-146030 | 10/1989 |
| JP | 3-288035 | 12/1991 |
| JP | 6-307489 | 11/1994 |
| JP | 2003-74617 | 3/2003 |
| JP | 2003-294078 | 10/2003 |
| JP | 2003-322197 | 11/2003 |
| JP | 2004-19704 | 1/2004 |

OTHER PUBLICATIONS

Patent Abstracts of Japan; vol. 2003, No. 07; JP 2003074617, Mar. 12, 2003.
Patent Abstracts of Japan; vol. 2003, No. 12; JP 2003 294078, Oct. 15, 2003.

* cited by examiner

*Primary Examiner*—Thomas Williams
(74) *Attorney, Agent, or Firm*—Westerman, Hattori, Daniels & Adrian, LLP.

(57) ABSTRACT

A hydraulic antivibration device capable of reducing sufficiently strange sounds and susceptible of dampening fine amplitude, high frequency vibrations is provided. A partition unit comparting a liquid-filled chamber is constructed of an elastic partition membrane and a pair of displacement-regulating members each provided with a central first opening and plural second openings around it. The elastic partition membrane includes a central thick-walled section located within the first opening, a thin-walled section around it, and a stationary section at the outer periphery thereof, plural first ribs and plural second ribs. The first ribs and the second ribs are extended at the inner peripheral margin part of the thin-walled section in a radial fashion from the thick-walled section, and portions of the thin-walled section circumferentially sectioned by the ribs front to the first opening so that liquid entering from the first opening may pass through a passage to the second openings.

9 Claims, 10 Drawing Sheets

FIG. 16C COMP. EX. 2

FIG. 16B COMP. EX. 1

FIG. 16A EXAMPLE

HYDRAULIC ANTIVIBRATION DEVICE

BACKGROUND OF THE INVENTION

1. Field of the Invention

This invention relates to a hydraulic type antivibration device, more particularly to the one capable of exhibiting a good vibration control effect to both low frequency, large amplitude vibrations and high frequency, fine amplitude vibrations.

2. Description of Related Art

Hitherto as a hydraulic antivibration device, for example, installed between an automotive transmission and a car body frame, there is known such an antivibration device that is made up of a first attachment part, a cylindrical second attachment part, a vibration isolating base made of rubber-like elastomer interconnecting the former two, a diaphragm attached to the second attachment fitting to form a liquid-filled chamber between the diaphragm and the vibration isolating base, a partition comparting the liquid-filled chamber into a first liquid chamber on the vibration isolating base side and a second liquid chamber on the diaphragm side, and an orifice putting the first liquid chamber and the second liquid chamber into communication with each other, and wherein the partition includes an elastic partition membrane and a pair of displacement-regulating members for regulating the displacement amount of the elastic partition membrane from both sides of its both membrane faces, the pair of the displacement-regulating members being pierced by respective openings. In this antivibration device, when a large amplitude vibration is generated owing to irregularity of the road face during travelling, the liquid flows through the orifice between both liquid chambers and the vibration is dampened by reason of the liquid fluidization effect. On the other hand, when a fine amplitude vibration is generated, the liquid does not flow between both liquid chambers, but the elastic partition membrane undergoes reciprocating deformation and absorbs the internal pressure of the first liquid chamber to dampen the vibration.

In this hydraulic type of antivibration device, when the elastic partition membrane collides with the displacement-regulating members, strange or unusual sounds are liable to be generated. In the circumstances, as disclosed in U.S. Pat. No. 5,443,245 (Patent Reference 1), in order to diminish the contact area of the elastic partition membrane with grid-like displacement-regulating members, a technology of providing the displacement-regulating members with radial ribs is proposed. According to this proposed construction, strange sounds can be reduced to some degree, but the contact area between the elastic partition membrane and the displacement-regulating members cannot be diminished so much, so that strange sounds cannot be suppressed sufficiently. Moreover the area of the opening for transmitting the liquid pressure of the first liquid chamber to the elastic partition membrane is narrowed by the space amount of the grids of the displacement-regulating members, and consequently, it is hard to absorb the internal pressure of the first liquid chamber.

Further, in JP Patent Publication 2003-294078 A (Patent Reference 2) it is disclosed that in order to prevent leakage of liquid between through-holes at grid-like displacement-regulating members, spider web-like ribs surrounding the respective through-holes over a full periphery thereof are provided on faces of the elastic partition membrane. In this construction, because the ribs surround the respective through-holes over the full periphery thereof, the contact area of the elastic partition membrane with the displacement-regulating members is large, so that the dynamic load increases largely with the result that strange sounds are likely to be generated.

Furthermore in JP Patent Publication 2003-74617 A (Patent Reference 3) there is disclosed the construction that in order to suppress the tendency toward a high dynamic spring characteristic in a higher frequency range than the tuning frequency of the orifice while ensuring sufficiently the vibration controlling effect by the orifice, the elastic partition membrane is formed of a central thick-walled section, a thin-walled section at the outer periphery of the former, and a stationary section at the outer peripheral margin thereof, and an outer peripheral margin of the thick-walled section and the stationary section are pinched by a pair of displacement-regulating members over a full periphery of both in a compressed state in the thickness direction. In this case, the outer peripheral margin of the thick-walled section is pinched by the displacement-regulating members over a full periphery thereof, and consequently, the effective area of the opening for transmitting the liquid pressure of the first liquid chamber to the elastic partition membrane is small and the thick-walled section is difficult to move. As a consequence, a dynamic spring constant in a high frequency range (e.g., on the order of 100 Hz) is increased and a buzzing noise is prone to be generated.

Meanwhile, from U.S. Pat. No. 5,104,100 (Patent Reference 4) such a construction is known that a plurality of small protrusions are provided on either face (front face and reverse face) of an annular thick-walled section of the elastic partition membrane equally in the circumferential direction in a distributed manner so that the small protrusions may abut against a pair of the displacement-regulating members. However, this Reference is distinct from this invention regarding the fundamental structure of the elastic partition membrane in that slits or cuts are provided in the central area thereof and besides, the thick-walled section is provided with small protrusions abutting against the displacement-regulating members. Thus this Reference is different from this invention in the position relation of the elastic partition membrane to the displacement-regulating members as well as the constitution of the elastic partition membrane.

Further JP UM Application Publication 64-36737 (Patent Reference 5) describes that the elastic partition membrane is constructed of a central thick-walled section and a thin-walled section around it, but in the antivibration device of this Reference, no displacement-regulating members are provided, and consequently, no mention is made of ribs at the elastic partition membrane, still less of a position relation between the elastic membrane and displacement-regulating members.

SUMMARY OF THE INVENTION

In view of the state of the art described above, this invention has been made, and it is an object of this invention to provide a hydraulic antivibration device that is capable of reducing sufficiently strange sound attributed to collision of an elastic partition membrane with displacement-regulating members and simultaneously capable of reducing a dynamic spring constant in a high frequency range by making the area of an opening for transmitting the liquid pressure of a first liquid chamber to the elastic partition membrane large and further suppressing an increase in dynamic load thereby reducing the generation of strange sound due to that increase.

The hydraulic antivibration device, with which this invention is concerned, comprises a first attachment fitting, a cylindrical second attachment fitting, a vibration isolating base made of rubber-like elastomer interconnecting the former two, a diaphragm attached to the second attachment fitting to form a liquid-filled chamber between the diaphragm and the vibration isolating base, a partition unit comparting the liquid-filled chamber into a first liquid chamber on the vibration isolating base side and a second liquid chamber on the diaphragm side, and an orifice putting the first liquid chamber and the second liquid chamber into communication with each other, wherein the partition unit includes an elastic partition membrane and a pair of displacement-regulating members for regulating the displacement magnitude of the elastic partition membrane from both sides of its both membrane faces, the pair of the displacement-regulating members being pierced by respective openings mutually coinciding in an overlapping manner when viewed in an axis center direction of the elastic partition membrane. And the hydraulic antivibration device is featured in that aforesaid openings consist of a first opening pierced in a radially central area of each of the displacement-regulating members and a plurality of second openings pierced around the first opening and disposed in a distributed manner; aforesaid elastic partition membrane includes a radially central thick-walled section located within the first opening when viewed in the axis center direction, a thin-walled section located radially outwardly of the thick-walled section and situated midway in the thickness direction of the thick-walled section and so as to be spaced apart from the pair of the displacement-regulating members, a stationary section surrounding outer periphery sides of the displacement-regulating members, a plurality of first ribs provided on the one membrane face of the thin-walled section and having respective top ridges capable of abutting against the one displacement-regulating member, and a plurality of second ribs provided on the other membrane face of the thin-walled section and having respective top ridges capable of abutting against the other displacement-regulating member; a plurality of the first ribs and a plurality of the second ribs extend, at an inner peripheral margin part of the thin-walled section adjacent to the thick-walled section, in a radial fashion from an outer peripheral face of the thick-walled section, whereby the inner peripheral margin part of the thin-walled section is sectioned in plural portions in the circumferential direction by a plurality of the first ribs and a plurality of the second ribs; the thin-walled section portions thus sectioned front to the first opening in the axis center direction, and a liquid passage leading the liquid entered from the first opening into the thin-walled section portions toward the second openings is provided between a part of the displacement regulating member intermediating between the first opening and the second openings and the thin-walled section portions opposing the former (the displacement-regulating member part).

According to the construction stated above, where a high frequency, fine amplitude vibration is generated, the hydraulic pressure of the first liquid chamber is transmitted through the first openings of the displacement-regulating members to the thick-walled section of the elastic partition membrane without the liquid being flowed through between the first liquid chamber and the second liquid chamber, and through the second openings also to the thin-walled section of the elastic partition membrane, whereby the thick-walled section and the thin-walled section are subject to reciprocating deformation to absorb the hydraulic pressure of the first liquid chamber and the high frequency, fine amplitude vibration is dampened. When a large amplitude vibration is generated and the hydraulic pressure in the first liquid chamber reaches a predetermined value, the deformation of both the thick-walled section and thin-walled section reaches their limits and the liquid flows through the orifice to be fluidized between both liquid chambers. Due to the fluidization effect, the low frequency, large amplitude vibration is dampened.

According to this invention, in particular, because the thin-walled section portions around the thick-walled section of the elastic partition membrane are constructed to front to the first opening so that the liquid entered from the first opening to the thin-walled section portions around the thick-walled section may be flowed to the second openings side, the hydraulic pressure of the first liquid chamber is transmitted via the first opening also to the thin-walled section. That is, it is possible to make part of the first opening to function also as a high frequency orifice for reciprocating and deforming the thin-walled section. Because of that, the area of the opening for transmitting the hydraulic pressure in the first liquid chamber to the elastic partition membrane can be enlarged. Moreover because the elastic partition membrane is not subject to regulation of displacement at the thick-walled section by the displacement-regulating members, but regulated of displacement only by the radial ribs extended from the thick-walled section, the thick-walled section is easily mobile. Taken overall, it is possible to reduce the dynamic spring constant in a high frequency range (e.g., 100 Hz or thereabouts) to effectively dampen high frequency, fine amplitude vibrations, typically booming noise.

Further according to the foregoing construction, because the elastic partition membrane is subject to regulation of displacement only by the first ribs and second ribs extended from the thick-walled section in a radial fashion and the entirety of the elastic partition membrane is capable of reciprocating displacement, it is possible to suppress the increase in dynamic load to suppress the generation of strange sounds.

In addition because the top ridges of the first ribs and of the second ribs merely abut on the displacement-regulating members, it is possible to make the contact area of the elastic partition membrane with the displacement-regulating members sufficiently small and accordingly, to reduce sufficiently strange sound attributed to collision of the elastic partition membrane with the displacement-regulating members. Here, although the stationary section of the elastic partition membrane is also in contact with the displacement-regulating members, the stationary section is fixed to the displacement-regulating members and consequently, does not constitute a source of generation of strange sounds.

If the elastic partition membrane is made too susceptible to deformation, following a hydraulic pressure change in the first liquid chamber, when a large amplitude vibration is generated, it will be difficult to regulate the displacement of the elastic partition membrane by a desired internal pressure of the first liquid chamber, so that the liquid is hard to pass through the orifice. In contrast, according to the aforesaid construction, the radially central side of the elastic partition membrane is constructed as the thick-walled section thereby to fortify the stiffness, and consequently, it is easy to subject the elastic partition membrane to regulation of displacement by a desired hydraulic pressure in the first liquid chamber.

In this invention, it is preferred that the thin-walled section portions located outwardly of the tip ends of the first ribs and of the second ribs in the radial direction of the elastic partition membrane be constructed so as to front to the second openings of the pair of the displacement-regulating members. This is because the elastic partition membrane is hard to follow the hydraulic pressure change in the first liquid chamber due to the synergy that if the first ribs and the second ribs are provided as long ribs extending over the outer peripheral margin of the thin-walled section, the stiffness of the thin-walled section becomes too high and the elastic partition membrane is provided at its central part with the thick-walled section. By the construction as described above, the hydraulic pressure is easy to absorb at the thin-walled section, so that it is possible to absorb sufficiently fine amplitude vibrations.

Again in the present invention, the first opening, the thick-walled section, and a plurality of the second openings may be configured in a circular shape, a disc shape, and an arc shape extending in the circumferential direction alongside of the thick-walled section, respectively. Thereby the configuration of the elastic partition membrane can be simplified.

Further it is alternatively possible that a plurality of the first ribs and a plurality of the second ribs be disposed equi-angularly in the circumferential direction of the thick-walled section, whereby the thick-walled section can be supported from its surroundings by an even force thereby to prevent that a force is applied leaning to the thick-walled section.

Alternatively, the tip ends of the first ribs and the tip ends of the second ribs may be disposed radially inwardly of the inner peripheral margins of a plurality of the second openings, whereby it is easier to avoid the stiffness of the thin-walled section from becoming too high and it is possible to avoid the trouble that the elastic partition membrane is hard to follow a hydraulic pressure change and accordingly, to absorb more sufficiently fine amplitude vibrations.

In the invention, top portions of the top ridges of the first ribs remotest from the thick-walled section and top portions of the top ridges of the second ribs remotest from the thick-walled section may jut out outwardly of the thick-walled section in the thickness direction thereof. In this case, the remotest top portions of the first ribs and the remotest top portions of the second ribs come into contact with the displacement-regulating members, and it is possible to make the area of a contact face between the elastic partition membrane and the displacement-regulating members sufficiently small.

As an expedient of making the area of the contact face between the elastic partition membrane and the displacement-regulating members sufficiently small, for example, it is conceivable to provide a plurality of small protrusions on either membrane face of main body of the elastic partition membrane so that the small protrusions may contact with the displacement-regulating members when the elastic partition membrane and the displacement-regulating members contact with each other. According to that expedient, when the small protrusions are compressed due to the contact, the membrane faces of the main body of the elastic partition membrane collide with the displacement-regulating members and there is a danger of strange sounds being louder. On the contrary, according to this invention, even if the top portions corresponding to the small protrusions are compressed, the ribs as the main body collide with the displacement-regulating members, and consequently, it is possible to make the area of the contact face sufficiently small, thus suppressing the generation of strange sounds. In addition, because the remotest top portions of the top ridges of the first ribs and the remotest top portions of the top ridges of the second ribs from the thick-walled section jut out, when the elastic partition membrane and the displacement-regulating members contact with each other, it is possible to secure to bring the aforesaid top portions into contact with the displacement-regulating members. Moreover it is possible to support stably the thick-walled section through the first ribs and the second ribs with the displacement-regulating members, preventing the posture of the thick-walled section from collapsing.

Again in this invention, the first ribs and the second ribs may be pinched and held by a pair of the displacement-regulating members, whereby it is possible to stabilize the posture of the elastic partition membrane.

The first ribs and the second ribs may be each of a triangular shape in cross-sectional plane in elongation direction, its apex being the top ridges, whereby it is possible to minimize the area of contact face of the ribs with the displacement-regulating members while preventing the collapse of the ribs to exhibit more effectively the strange sound suppressing effect.

Further alternatively in this invention, the first liquid chamber may be provided internally with a stirring plate and an orifice on the first liquid chamber side defined between an outer peripheral margin of the stirring plate and an internal peripheral face of the first liquid chamber. Where a high frequency vibration is input as described above, the elastic partition membrane is subject to reciprocating deformation to absorb the hydraulic pressure in the first liquid chamber thereby suppressing a tendency toward high dynamic spring characteristic. However where a higher frequency vibration is input than above, it is conceivable that a deformation resistance of the elastic partition membrane is increased, resulting in insufficiency in low dynamic spring characteristic. In this case, the provision of the stirring plate makes it possible to resonate the liquid flowing through the orifice on the first liquid chamber side in a high frequency range (set the resonance frequency of the liquid at a high value), thus achieving a low spring characteristic of the present device in a high frequency range.

In accordance with this invention thus described above, it is possible to reduce sufficiently the strange sound due to collision of the elastic partition membrane with the displacement-regulating members and concurrently to reduce the dynamic spring constant in a high frequency range to dampen high frequency, fine amplitude vibrations such as booming noise, etc. as well as to suppress an increase in dynamic load to reduce strange sound due to that increase.

DESCRIPTION OF THE PREFERRED EMBODIMENTS

Figure 1:
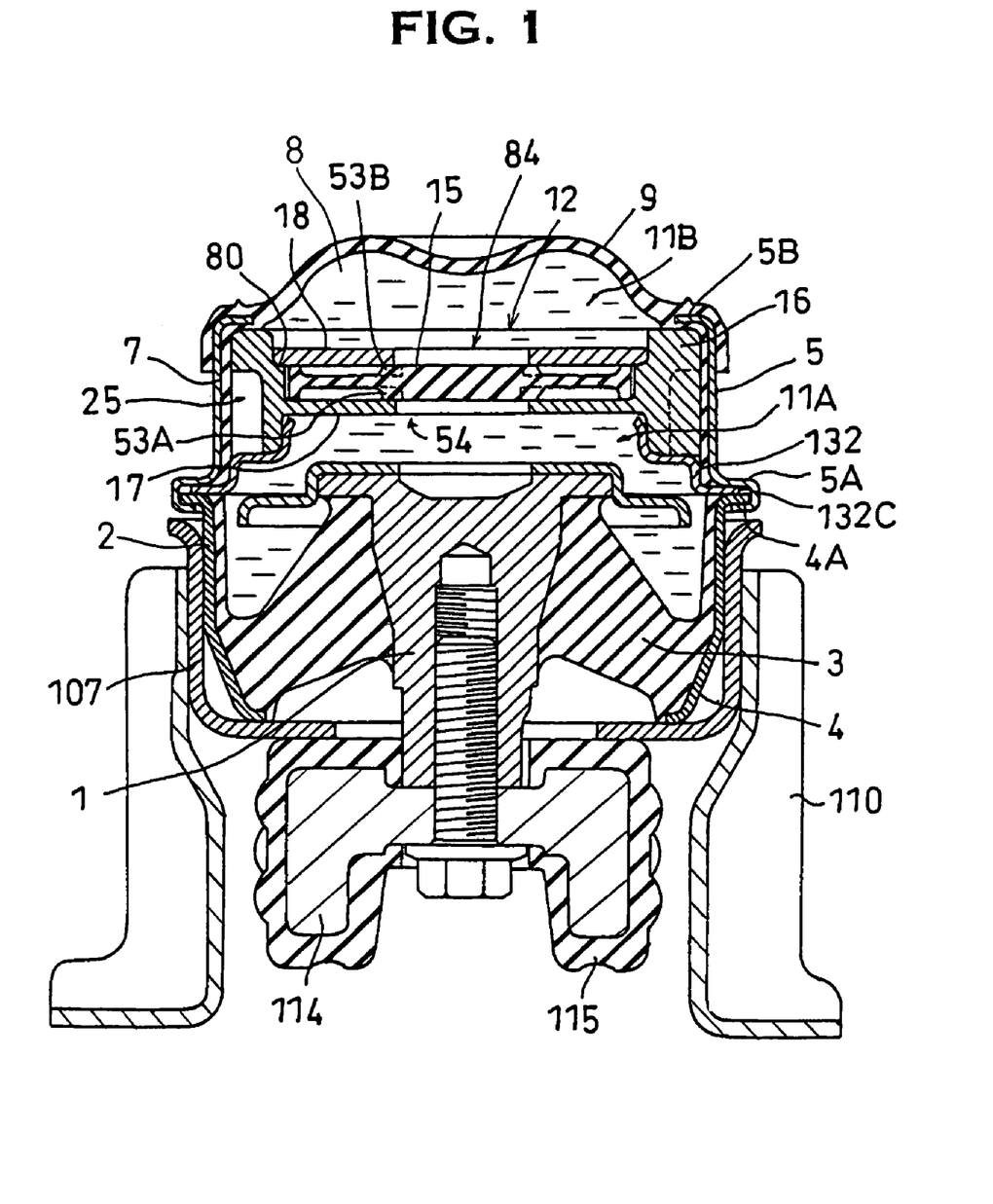
FIG. 1 is a longitudinal sectional view of a hydraulic antivibration device pertaining to one embodiment of this invention.
Figure 2:
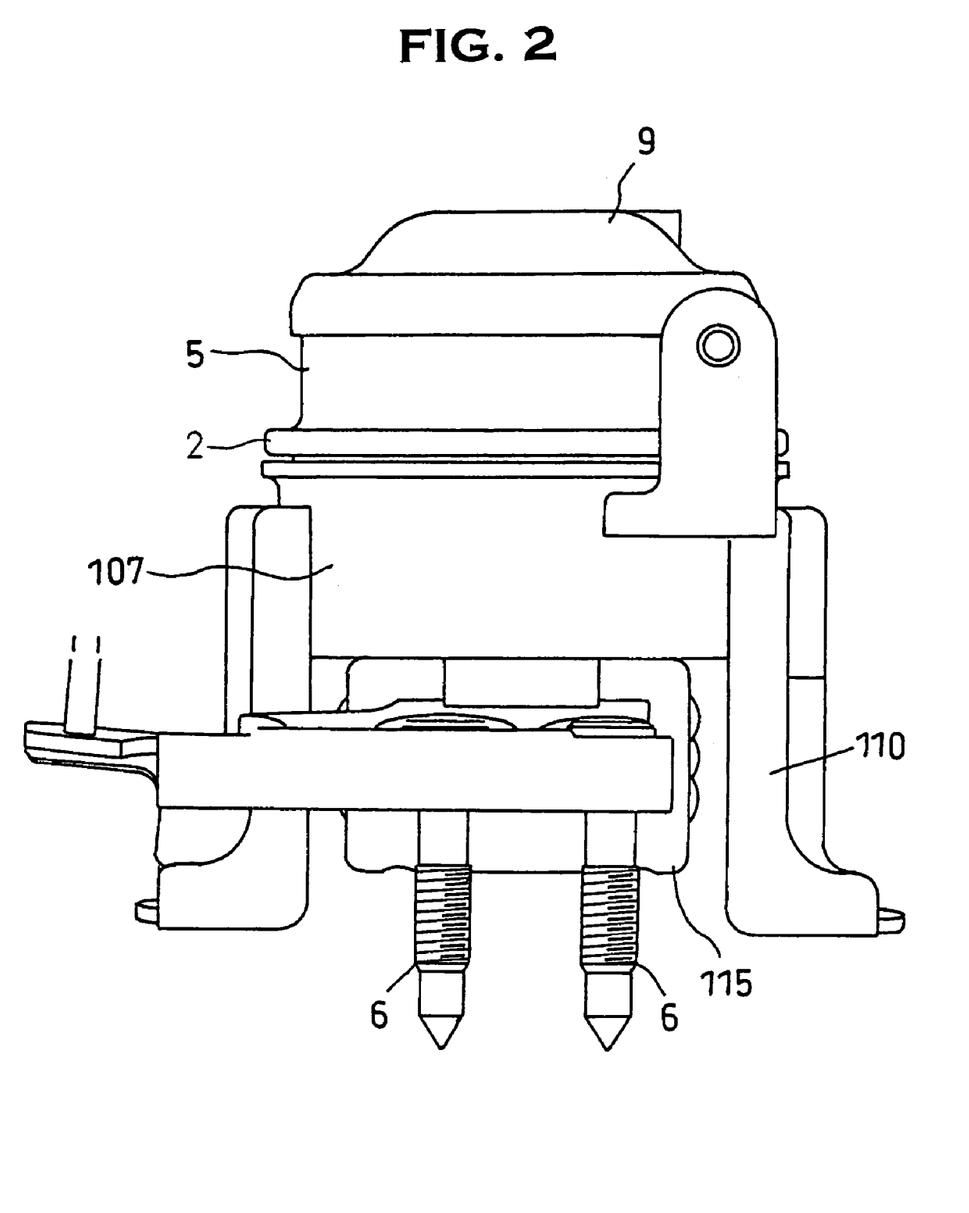
FIG. 2 is a front elevational view of the antivibration device in FIG. 1.

Embodiments of the invention will be hereinafter described with reference to the accompanying drawings. In FIGS. 1 and 2, a hydraulic antivibration device for use in a FR car is illustrated. This hydraulic antivibration device is provided with a first attachment fitting 1 to be attached through the intermediary of a first attachment bracket 114 to a transmission, a cylindrical second attachment fitting 2 to be attached through a second attachment bracket 110 to a vehicle body side member, and a truncated conical vibration-isolating base 3 made of rubber-like elastomer linking these.

The first attachment fitting 1 is configured in a stepped columnar shape, with its lower end bolted to the first attachment bracket 114 having a U-shaped cross-section. The first attachment bracket 114 is covered with a rubber member 115. The reference numeral 6 in FIG. 2 designates a plurality of attachment bolts. The second attachment fitting 2 includes a lower cylindrical fitting 4, to which the vibration-isolating base 3 is vulcanization molded, and an upper cylindrical fitting 5 concentric with the lower cylindrical fitting 4, which is in turn internally fitted and accommodated in a cylindrical fitting 107 for accommodation. The vibration-isolating base 3 is vulcanization bonded to both an outer peripheral face of the first attachment fitting 1 and an inner peripheral face of the lower cylindrical fitting 4.

To a lower end of the upper cylindrical fitting 5, a diaphragm 9 made of rubber membrane is vulcanization molded to form a liquid-filled chamber 8 between the diaphragm and the vibration-isolating base 3. Further a partition unit 12 comparting the liquid-filled chamber 8 into a first liquid chamber 11A on the vibration-isolating base 3 side and a second liquid chamber 11B on the diaphragm 9 side is pinched and secured in place by both a bent portion 5B of the upper cylindrical fitting 5 at its upper end and a stepped cylindrical pinching member 132. At the lower end of the pinching member 132 a flange 132C is formed, and the flange 132C, a flange 4A of the lower cylindrical fitting 4, and a flange 5A of the upper cylindrical fitting 5 are integrally secured by crimping in a manner such that the flange 132C is sandwiched by the two flanges 4A, 5A.

Figure 4:
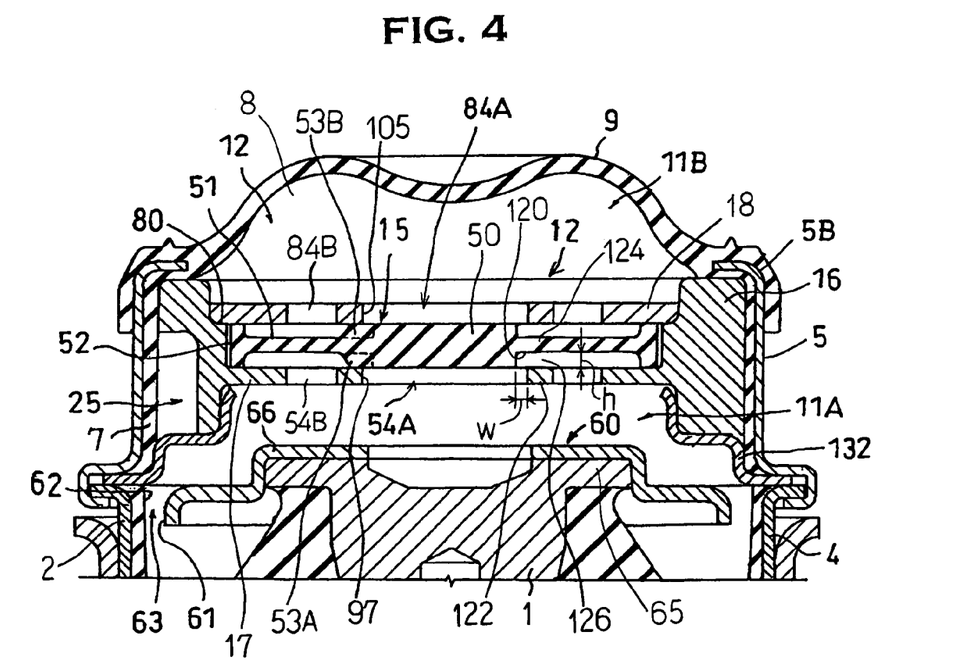
FIG. 4 is a partially enlarged, longitudinal sectional view of the foregoing antivibration device taken along IV-IV line in FIG. 3.

As shown in FIG. 4, the partition unit 12 is made up of a disc-form elastic partition membrane 15 made of rubber membrane, a cylinder member 16 accommodating the elastic partition membrane 15 to bear it with a first displacement-regulating member 17 provided integrally with the cylinder member 16 on its inner peripheral face side, and a second displacement-regulating member 18 covering an opening of the cylinder member 16 at its one end side. That is, the first displacement-regulating member 17 and the second displacement-regulating member 18 serve to regulate the displacement amount of the elastic partition membrane 15 from both sides of membrane faces of the elastic partition membrane 15. The first displacement-regulating member 17 and the second displacement-regulating member 18 are defined, respectively, with opening groups 54, 84 coinciding with each other in a superposing manner when viewed in an axis center direction of the elastic partition membrane 15.

The first liquid chamber 11A and the second liquid chamber 11B are put in communication with each other through an orifice 25 as a shake orifice, which is, in turn, formed between an outer peripheral face of the cylinder member 16 and an inner peripheral face of the upper cylindrical fitting 5, more particularly, a rubber membrane 7 vulcanization molded to the inner peripheral face of the upper cylindrical fitting 5. As shown in FIG. 7, the cylinder member 16 is provided at its outer periphery with an orifice-forming channel 83. The orifice 25 communicates with the second liquid chamber 11B through an upper cutout 58 of the cylinder member 16 (cf. FIG. 6) and with the first liquid chamber 11A through an opening 59 formed in the pinching member 132 (cf. FIG. 5).

Figure 8:
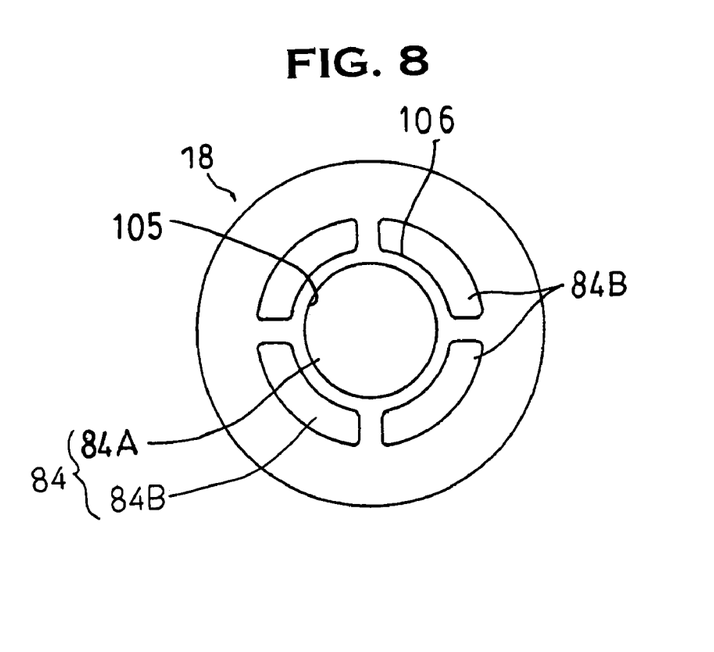
FIG. 8 is a front elevation of a second displacement-regulating member of the foregoing antivibration device.
Figure 9:
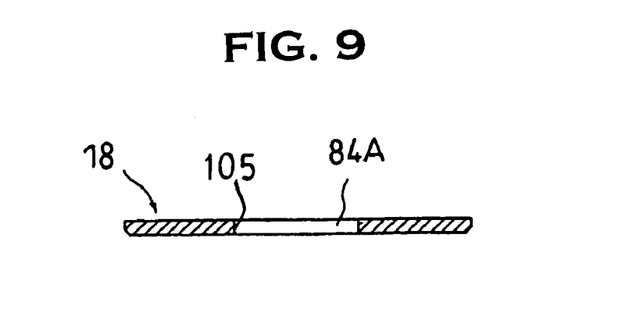
FIG. 9 is a longitudinal sectional view of the second displacement-regulating member in FIG. 8.
Figure 10:
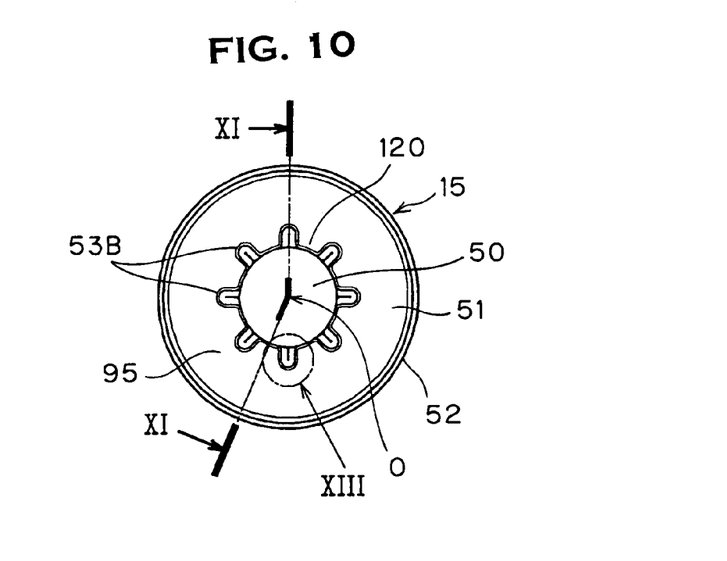
FIG. 10 is a front elevation of an elastic partition membrane of the foregoing antivibration device.
Figure 11:
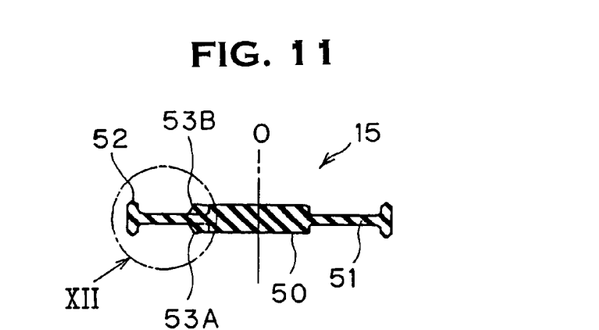
FIG. 11 is a sectional view taken along XI-XI line of FIG. 10.

As shown in FIGS. 8 and 9, the second displacement-regulating member 18 is configured in a disc form and internally press fitted and seated on an attachment seat 80 formed at the opening of the cylinder member 16 on its upper end side. The opening group 84 of the second displacement-regulating member 18 consists of a first opening 84A of a circular shape formed in a radially central area thereof and four second openings 84B of an arc-like shape formed around the first opening 84A in a distributed manner. The four second openings 84B are of the same size and shape, and situated in a point symmetry relation about an axis center of the first opening 84A.

Figure 6:
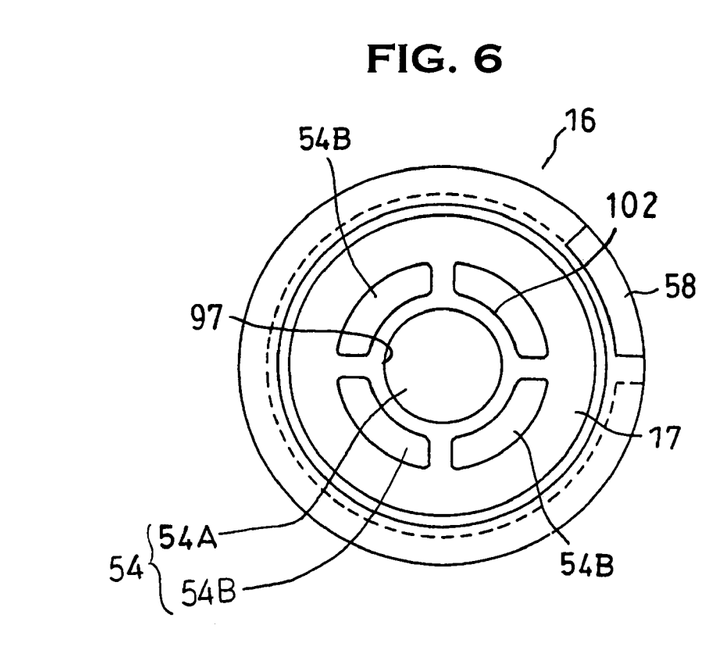
FIG. 6 is a front elevation of a cylinder member of the foregoing antivibration device.
Figure 7:
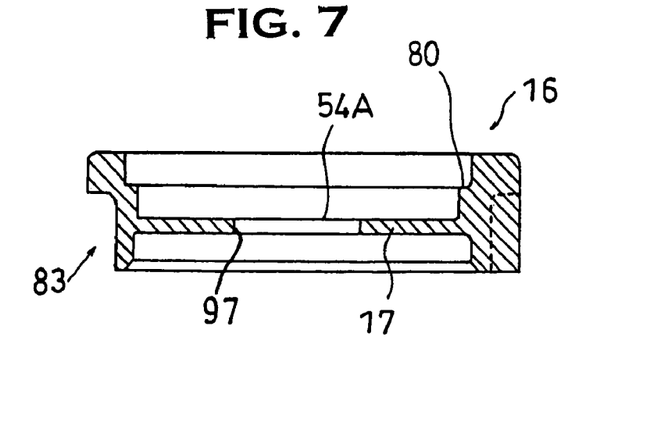
FIG. 7 is a longitudinal sectional view of the cylinder member in FIG. 6.

As illustrated in FIG. 6, the opening group 54 of the first displacement-regulating member 17 consists of a first opening 54A of a circular shape formed in a radially central area thereof and four second openings 54B of an arc-like shape formed around the first opening 54A in a distributed manner. The four second openings 54B are of the same size and shape, and situated in a point symmetry relation about the axis center of the first opening 54A.

The first opening 54A of the first displacement-regulating member 17 and the first opening 84A of the second displacement-regulating member 18 are of the same size and shape, and the second openings 54B of the first displacement-regulating 17 and the second openings 84B of the second displacement-regulating member 18 are of the same size and shape. And when viewed in the axis center direction, the first opening 54A of the first displacement-regulating member 17 and the first opening 84A of the second displacement-regulating member 18 are situated in the same position in a superposing manner whereas the second openings 54B of the first displacement-regulating member 17 and the second opening 84B of the second displacement-regulating member 18 are situated in the same position in a superposing manner.

As illustrated in FIGS. 10 to 13, the elastic partition membrane 15 is made up of a disc-shaped thick-walled section 50 located in a radially central area within the first openings 54A, 58A when viewed in the axis center direction, a thin-walled section 51 located radially outwards of the thick-walled section 50 and in an intermediate area relative to the thickness direction of the thick-walled section 50 (axis center direction of the elastic partition membrane 15) and spaced apart from a pair of the displacement-regulating members 17, 18, eight pieces of first ribs 53A provided on the one membrane face 91 of the thin-walled section 51 and having their top ridges 81 abutting against the first displacement-regulating member 17, and eight pieces of second ribs 53B provided on the other membrane face 93 of the thin-walled section 51 and having top ridges 101 abutting against the second displacement-regulating member 18.

A plurality of the first ribs 53A and a plurality of the second ribs 53B are extended in a radial fashion from an outer peripheral face 92 of the thick-walled section 50 at an inner periphery side margin part of the thin-walled section 51 adjacent to the thick-walled section 50. More particularly, the first ribs 53A are provided, at the boundary of the thick-walled section 50 and the thin-walled section 51, integrally with the one membrane face 91 of the thin-walled section 51 and the lower outer peripheral face 92 of the thick-walled section 50 so as to be situated around the thick-walled section 50 in a radial fashion. On the other hand, the second ribs 53B are provided, at the boundary between thick-walled section 50 and the thin-walled section 51, integrally with the other membrane face 93 of the thin-walled section 51 and the upper outer peripheral face 92 of the thick-walled section 50 so as to be situated in a radial fashion around the thick-walled section 50. And a part 95 of the thin-walled section located radially outwards of tip ends 94 of the first ribs 53A and of the second ribs 53B is constructed to front to the second openings 54B, 84B of the pair of the displacement-regulating members 17, 18 (cf. FIG. 3).

A plurality of the first ribs 53A and a plurality of the second ribs 53B are arranged in a radial manner and at equal angular intervals of 45 degrees relative to the axis center O of the thick-walled section, and the respective first ribs 53A and the respective second ribs 53B coincide with each other in a superposing manner when viewed in the axis center direction of the elastic partition membrane 15. The respective four pieces of the second openings 54B, 84B are disposed at equal angular intervals in the circumferential direction of the thick-walled section 50, and the second openings 54B, 84B assumes an arc shape extending along the circumferential direction of the thick-walled section 50 (cf. FIGS. 6, 8).

Figure 14:
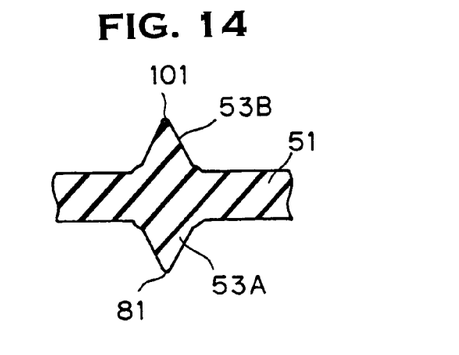
FIG. 14 is a sectional view taken along XIV-XIV line in FIG. 13.

The first ribs 53A and the second ribs 53B assume respectively a triangular shape having respective apexes of top ridges 81, 101 (cf. FIG. 14) in transversal cross-section in the elongation direction thereof. The tip ends 94 of the first ribs 53A and the second ribs 53B are formed to slant in a manner such that the membrane face sides of the thin-walled section 51 are located more radially outwardly (cf. FIG. 12). Further, the tip ends 94 of the first ribs 53A and the second ribs 53B are situated radially inwardly of inner peripheral margins 102, 106 of a plurality of the second openings 54B, 84B, respectively (cf. FIG. 3).

Figure 12:
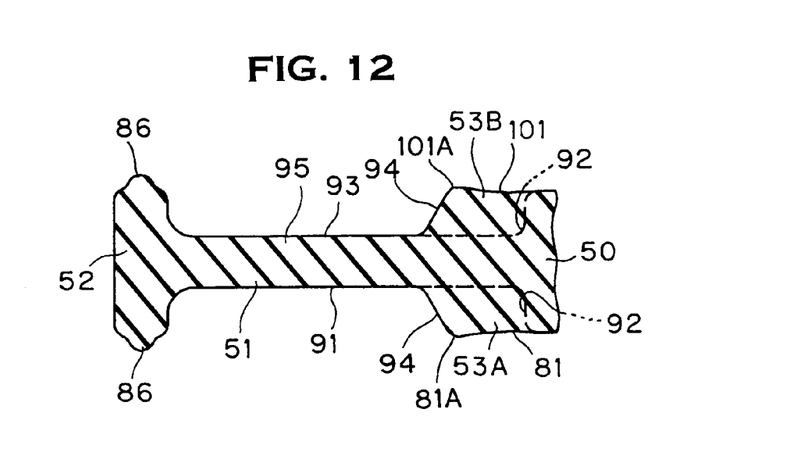
FIG. 12 is an enlarged view of a circumscribed part of XII in FIG. 11.
Figure 13:
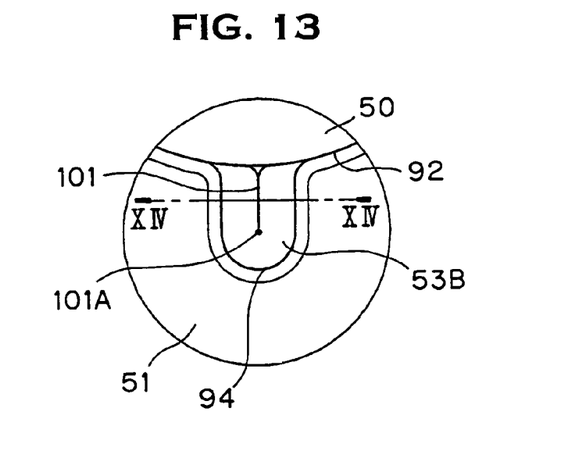
FIG. 13 is an enlarged view of a circumscribed part of XIII in FIG. 10.

As depicted in FIG. 12, of the top ridge 81 of the first rib 53A and the top ridge 101 of the second rib 53B, a remotest top portion 81A and a remotest top portion 101A respectively from the thick-walled section 50 protrude slightly outwardly of the thick-walled section 50 in the thickness direction thereof. And the first ribs 53A and the second ribs 53B thus constructed are pinched and held by the first displacement-regulating member 17 and the second displacement-regulating member 18.

A stationary section 52 of the elastic partition membrane 15 projects from the thin-walled section 51 on both sides thereof in the thickness direction of the elastic partition membrane 15. Its projecting ends are formed each as a raised portion 86 of an arc form in cross-section. A length between tip faces of both raised portions 86 is set to be longer than the thickness of the thick-walled section 50. The stationary section 52 is pinched and held by a pair of the displacement-regulating members 17, 18.

Figure 3:
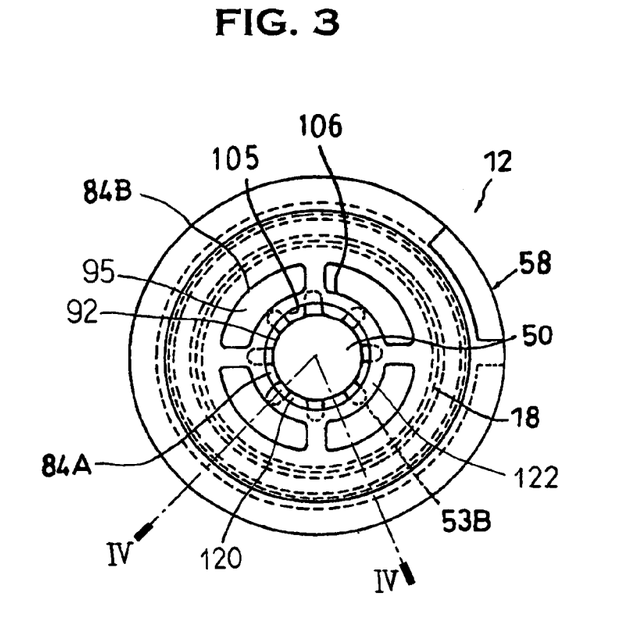
FIG. 3 is a plan view of a partition unit of the foregoing antivibration device.
Figure 5:
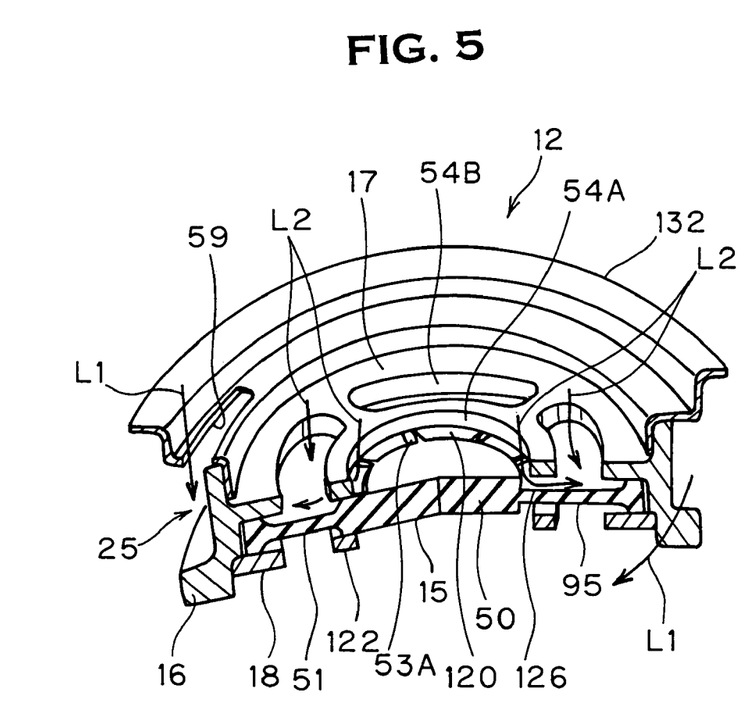
FIG. 5 is a partially cutaway perspective view in cross-section of the partition unit in FIG. 3.

As shown in FIGS. 3 and 5, the thin-walled section 51 of the elastic partition membrane 15 is sectioned, at its inner periphery side margin part, by the plural first ribs 53A and second ribs 53B into plural portions 120 in the circumferential direction on both front and reverse faces. The thin-walled section portions 120 thus sectioned are constructed to front to the first openings 54A, 84A in the axis center direction of the elastic partition membrane 15, as shown in FIG. 4. That is, the first openings 54A, 84A are formed in a larger diameter than the thick-walled section 50 so that a predetermined gap may be ensured in the radial direction between opening margins 97, 105 thereof and the outer peripheral face 92 of the thick-walled section 50, and consequently, the thin-walled section 51 extends at its inner peripheral edge part up to the inside of the first openings 54A, 84A when viewed in the axis center direction. Namely, around the thick-walled section 50 such a passage for liquid is ensured that opens from the thin-walled section portions 120 in the axis center direction. Further since only the first ribs 53A and the second ribs 53B extending in a radial fashion are provided as described above, between portions 122 of the displacement-regulating members extending between the first openings 54A, 84A and the second openings 54B, 84B and portions 124 of the thin-walled section opposing the former (122), there is ensured a passage 126 through which liquid flows. Thus as shown in FIG. 5, liquid entering from the first opening 54A into the thin-walled section portions 120 is adapted to pass through the passage 126 to flow toward the second openings 54B. In FIG. 5 the reference character L1 stands for a liquid flow passing through a shake orifice whereas L2 stands for liquid flow passing through a high frequency orifice for causing reciprocating deformation of the thin-walled section 51.

As shown in FIG. 4, in the first liquid chamber 11A, a disk-shaped stirring plate 60 is provided and an orifice 63 on the first liquid chamber side is thus formed between an outer peripheral margin 61 of the stirring plate 60 and an inner peripheral face 62 of the first liquid chamber 11A. The stirring plate 60 is secured to the upper end of the first attachment fitting 1 piercing the vibration-isolating base 3 by externally fitting a coupling portion 66 bulging upwardly in a central area thereof onto the upper end.

In the hydraulic antivibration device thus constructed above in this embodiment, the elastic partition membrane 15 performs, on its front and reverse faces, abutment supporting for displacement regulation to the displacement-regulating members 17, 18 only by the eight pieces of the first ribs 53A and the second ribs 53B, and the thick-walled section 50 is not subject to direct abutment supporting by the displacement-regulating members 17, 18. Therefore the thin-walled section 51 and the thick-walled section 50 are easily mobile despite that they are regulated of displacement, and consequently, a remarkable reduction effect of dynamic spring constant in a high frequency range is achieved.

Further as shown in FIG. 5, the liquid entering from the first opening 54A not only acts on the thick-walled section 50, but flows from around the thick-walled section 50 to the thin-walled section portions 120 and passes through the passage 126 toward the second openings 54B, thus acting on the entirety of the thick-walled section 50. As a consequence, it is possible to make part of the first opening 54A as well as the second openings 54B to function as an orifice for reciprocating and deforming the thin-walled section 51. Stated another way, a total area of open areas of the four second openings 54B and open areas of eight gaps sectioned around the thick-walled section 50 by the eight first ribs 53A is constituted as an orifice cross-sectional area of the high frequency orifice for the thin-walled section 51, and consequently, it is possible to ensure a lager cross-sectional area than before by the amount of the eight gaps. Here it is preferred that in order to exhibit such orifice functions more effectively, a width w of the gap be set to be equal to or more than a height h of the passage 126 (cf. FIG. 4).

Again because the elastic partition membrane 15 is regulated of displacement only by the first ribs 53A and the second ribs 53B which are extended from the thick-walled section 50 in a radial fashion and there are no ribs surrounding a full circumference of the first openings 54A, 84A and the second openings 54B, 84B, the entirety of the elastic partition membrane 15 can move, so that it is possible to suppress an increase in dynamic load.

Because the top ridges 81, 101 of the eight first ribs 53A and second ribs 53B merely abut on the displacement-regulating members 17, 18, it is possible to make the contact areas of the elastic partition membrane 15 with the displacement-regulating members 17, 18 sufficiently small and accordingly, to reduce sufficiently the strange sound due to the collision with the displacement-regulating members 17, 18.

Figure 15:
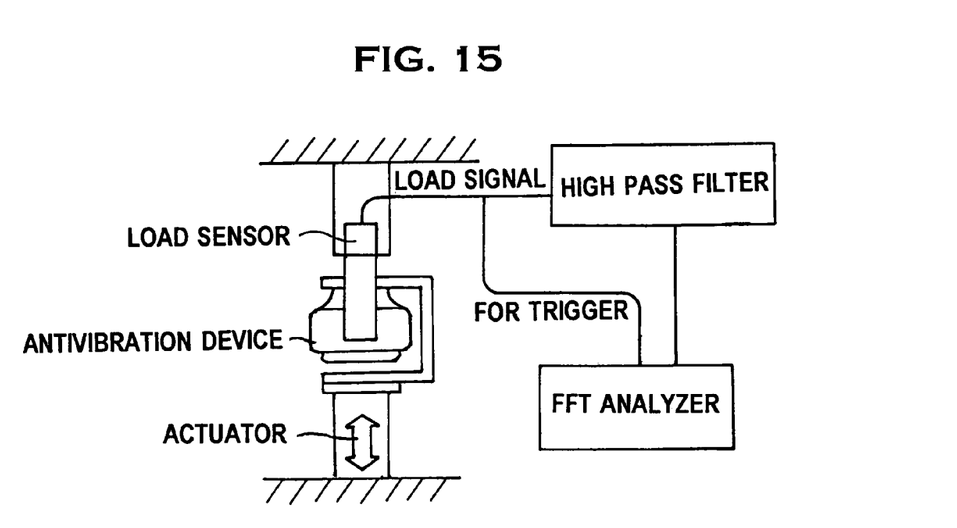
FIG. 15 is a diagrammatic representation showing a testing machine system for the evaluation of dynamic load characteristic and dynamic spring characteristic.

Now, measurement results of a test conducted for evaluating dynamic spring characteristic and dynamic load characteristic of the embodiment described above will be described. The test was conducted by use of a dynamic spring tester, "Dynamic Servo" (manufactured by Saginomiya Seisakusho, Inc.), to which a fixed frequency filter, "High Pass Filter 3624" (by NF Corporation) and a FFT (Fast Fourier Transform) analyzer "CF-6400" (by Ono Sokki) are connected as shown in FIG. 15. For the dynamic load characteristic, the dynamic spring tester was set under the conditions: an excitation frequency of 12 Hz, an excitation displacement of ±1.5 mm, a preload of 1300 N; the filter was set under the conditions of: a cut-off frequency of 100 Hz or less, order of 24 dB/OCT; and the FFT analyzer was set under the conditions: a sampling frequency of 800 Hz, a sampling number of 1024, window function: Hanning window, averaging: Power Sum 10 cycles, Trigger: ON. On the other hand, for the dynamic spring characteristic, measurement was conducted by sweeping the frequency under a preload of 1300 N and an excitation displacement of ±0.05 mm. The objects tested were respective antivibration devices having the following partition structures:

EXAMPLE OF THIS INVENTION

Figure 16A:
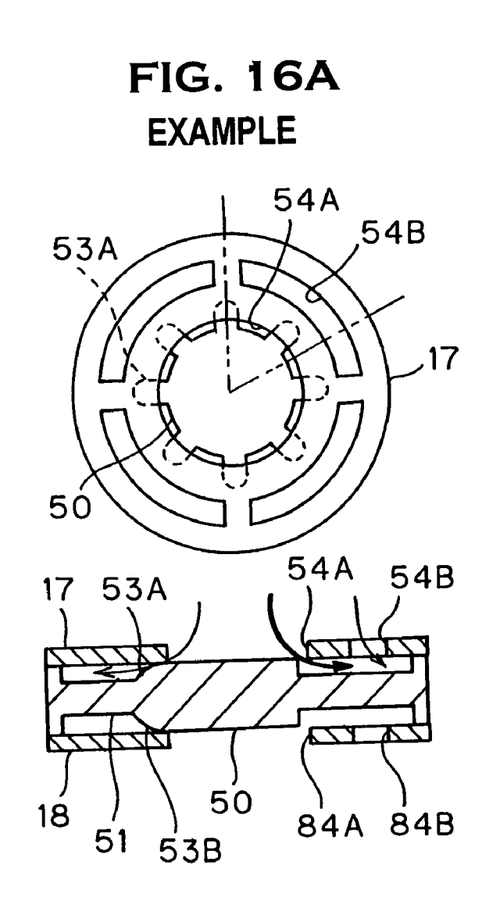
FIGS. 16A, 16B and 16C are schematic views of respective partition unit structures undergoing the aforesaid evaluation test, showing the Example, Comparative Example 1 and Comparative Example 2, in this turn.

The partition structure as described in the embodiment and illustrated in FIG. 16A;

Comparative Example 1

Figure 16B:
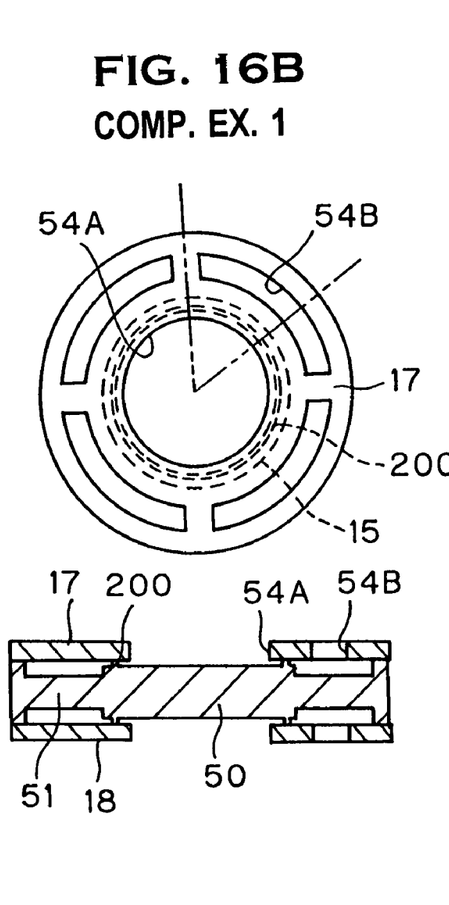

A structure as shown in FIG. 16B, wherein in the partition unit of the embodiment of this invention, the outer peripheral margin of the thick-walled section 50 on either face is provided with a protrusion 200 extending in a full circumference thereof and pinched and held by the displacement-regulating members 17, 18 over a full circumference thereof (analogous to Patent Reference 3 above);

Comparative Example 2

Figure 16C:
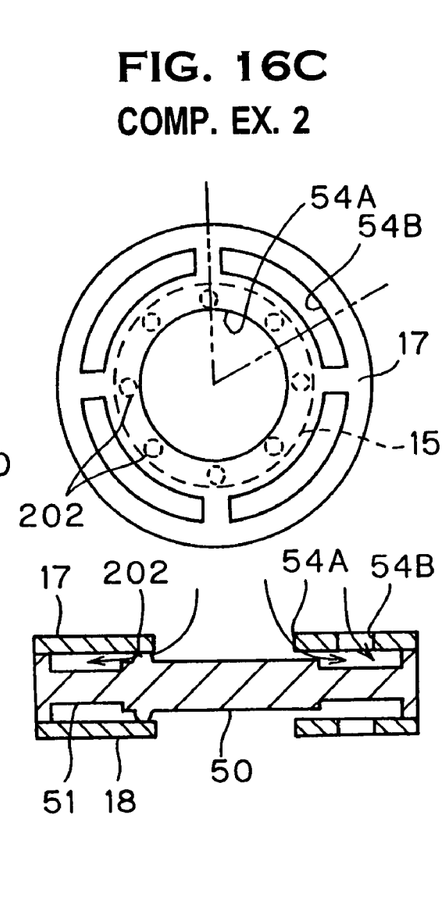

A structure as shown in FIG. 16C, wherein in the structure of Comparative Example 1 above, eight small protrusions 202 are equidistantly disposed in the circumferential direction instead of the aforesaid protrusion 200 (analogous structure to Patent Reference 3 above);

Comparative Example 3

The partition structure corresponding to Patent Reference 2 above (a structure wherein spider web-like ribs are formed on either face of the elastic partition membrane in a manner such that through-holes of the grid-like displacement-regulating members are surrounded respectively by them over a full circumference thereof).

Figure 17:
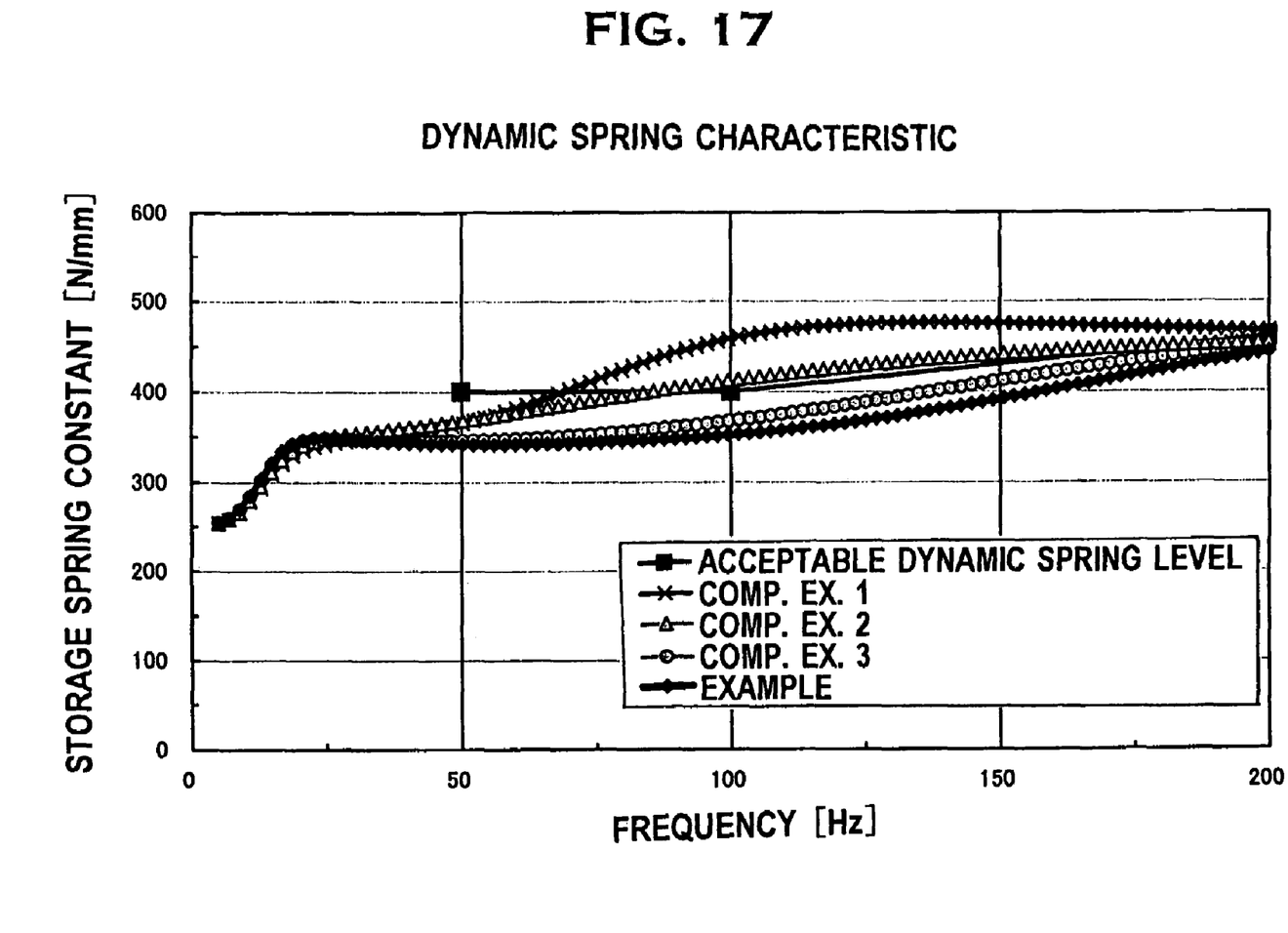
FIG. 17 is a graphical representation showing test results of the dynamic spring characteristic.

The measurement results of dynamic spring characteristic are as shown in FIG. 17. In Comparative Example 1, since the whole peripheral margin of the thick-walled section 50 is pinched and held by the displacement-regulating members 17, 18, the thick-walled section 50 is hard to move, and since there is no clearance at the central openings 54A, 84A of the displacement-regulating members 17, 18, the open area of the orifice for the thin-walled section 51 is small. Therefore the dynamic spring constant in the high frequency range exceeded the acceptable level, so that booming noise wan generated. In Comparative Example 2, a flow of liquid from the central openings 54A, 84A to the thin-walled section 51 in their surroundings is expected, but the orifice at that place is not open when viewed in the axis center direction as shown in FIG. 16C and besides, the clearance between the thick-walled section 50 and the displacement-regulating member 17 above it is so small that an effective orifice cross-sectional area cannot be obtained. As a consequence, the dynamic spring rate in the high frequency range exceeded the acceptable level. In contrast, in the antivibration device of the invention Example, because the space surrounding the thick-walled section 50 is open in the axis center direction and capable of effectively functioning as a high frequency orifice, the open area of the orifice for displacing the thin-walled section 51 becomes large and the thick-walled section 50 is easy to move, as well. Consequently a sufficiently low dynamic spring characteristic was achieved.

Figure 18:
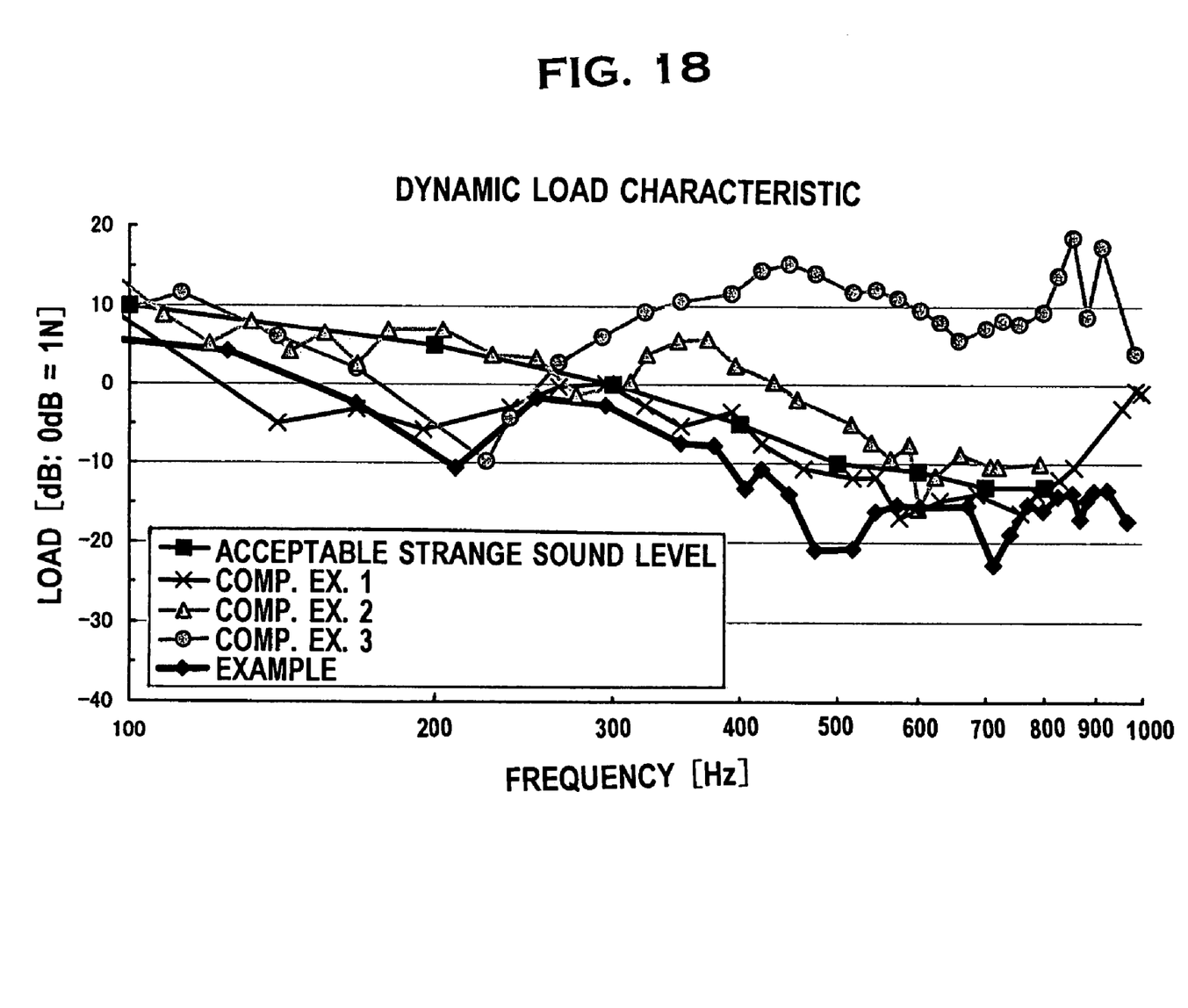
FIG. 18 is a graphical representation showing test results of the dynamic load characteristic.

On the other hand, measurement results of the dynamic load characteristic are as shown in FIG. 18. In Comparative Example 3, because the ribs abut on the full periphery of the respective through-holes and the contact area of the elastic partition membrane with the displacement-regulating members is large, an increase in dynamic load, in particular, in a high frequency range of 300 Hz and upwards was large and strange sounds were liable to be generated. Also in Comparative Example 2, the dynamic load exceeded the acceptable level. In contradistinction to those, in the antivibration device of Example, the elastic partition membrane as a whole is readily mobile and consequently, the dynamic load did not exceed the acceptable level and strange sounds were hardly generated.

According to the structure of the embodiment as described above, a low dynamic spring characteristic and a reduction of dynamic load in the high frequency range were compatible, and both a suppression effect of booming noise and a suppression effect of strange sound attributed to pulsation in the liquid chamber, etc. were remarkable.

The embodiment described above is constructed so that the first ribs 53A and the second ribs 53B may abut on the one pair of the displacement-regulating members 17, 18, but according to this invention, alternatively, such a constitution is also possible that the top ridges 81 of the first ribs 53A are constructed to be spaced apart from the first displacement-regulating member 17 and as vibration is input, the top ridges can be put into abutment on the first displacement-regulating member 17. Similarly it is also possible to construct the top ridges 101 of the second ribs 53B to be spaced apart from the second displacement-regulating member 18 and as the vibration is input, to put them into abutment on the second displacement-regulating member 18. That is, the top ridges 81 of the first ribs 53A suffice to be capable of abutment on the first displacement-regulating member 17, and the top ridges 101 of the second ribs 53B suffice to be capable of abutment on the second displacement-regulating member 18.

Further in the foregoing embodiment, the one displacement-regulating member 17 is provided integrally with the cylinder member 16 so as to span inner peripheral face portions of the cylinder member 16 defined with the orifice-forming groove 83 in its outer periphery, while the other displacement-regulating member 18 is internally fitted on the attachment seat 80 formed on the opening of the cylinder member 16 at the one end, and the stationary section 52 of the elastic partition membrane 15 is pinched and held by the one pair of the displacement-regulating members 17, 18. Instead of that constitution, according to this invention, it is also possible to adopt such a constitution that the one displacement-regulating member 17 is provided integrally with the cylinder member 16 between the inner peripheral face portions of the cylinder member 16 formed on its outer periphery with the orifice-forming groove 83 while a cylinder portion (not shown) linking to the outer periphery of the other displacement-regulating member 18 is externally fitted to the one end of the cylinder member 16, and the stationary section 52 of the elastic partition membrane 15 is pinched and held by a pair of the displacement-regulating members 17, 18. According to these constitutions, it is possible to decrease the total number of component parts and simplify the structure.

Otherwise this invention is also applicable to such a structure that the stirring plate 60 is not provided in the first liquid chamber 11A. Further this invention is applicable to a hydraulic antivibration device installed between an automotive engine and the vehicle body frame, as well.

The invention claimed is:

1. A hydraulic antivibration device comprising:
a first attachment fitting;
a cylindrical second attachment fitting;
a vibration isolating base made of elastomer interconnecting the first attachment fitting and the cylindrical second attachment fitting;
a diaphragm forming attached to the cylindrical second attachment fitting to form a liquid-filled chamber between the diaphragm and the vibration isolating base;
a partition unit comparting the liquid-filled chamber into a first liquid chamber on the vibration isolating base side and a second liquid chamber on the diaphragm side; and
an orifice putting the first liquid chamber and the second liquid chamber into communication with each other;
the partition unit including an elastic partition membrane and one pair of displacement-regulating members for regulating the displacement amount of the elastic partition membrane from both sides of membrane faces thereof, the one pair of the displacement-regulating members being pierced by respective opening groups mutually coinciding in a superposing manner when viewed in the axis center direction of the elastic partition membrane,
wherein said opening groups consist of a first opening pierced in a radially central area of each of the displacement-regulating members and a plurality of second openings pierced around the first opening in a distributed manner;
said elastic partition membrane includes a radially central thick-walled section located within the first openings when viewed in an axis center direction,
a thin-walled section located radially outwardly of the thick-walled section, and situated midway in the thickness direction of the thick-walled section and to be spaced apart from the pair of the displacement-regulating members,
a stationary section surrounding outer periphery sides of the displacement-regulating members,
a plurality of first ribs provided on the one membrane face of the thin-walled section and having respective top ridges capable of abutting against the one displacement-regulating member, and
a plurality of second ribs provided on the other membrane face of the thin-walled section and having respective top ridges capable of abutting against the other displacement-regulating member;
wherein a plurality of the first ribs and a plurality of the second ribs extend, at an inner peripheral margin part of the thin-walled section adjacent to the thick-walled section, in a radial fashion from an outer peripheral face of the thick-walled section, whereby the inner peripheral margin part of the thin-walled section is sectioned in plural portions in the circumferential direction by a plurality of the first ribs and a plurality of the second ribs;
the thin-walled section portions thus sectioned front toward the first opening in the axis center direction, and a liquid passage leading the liquid entered from the first opening into the thin-walled section portions toward the second openings is provided between a part of the one displacement-regulating member intermediating between the first opening and the second openings and a thin-walled section part opposing the displacement-regulating member part.

2. The hydraulic antivibration device as set forth in claim 1, wherein a portion of the thin-walled section located outwardly of tip ends of the first ribs and the second ribs in the radial direction of the elastic partition membrane is constructed to front to the second openings of each of the displacement-regulating members.

3. The hydraulic antivibration device as set forth in claim 1, wherein the first opening, the thick-walled section and a plurality of the second openings are formed in the form of, respectively, a circle, a disc, and an arc extending along the circumferential direction of the thick-walled section.

4. The hydraulic antivibration device as set forth in claim 3, wherein a plurality of the first ribs, a plurality of the second ribs, and a plurality of the second openings are disposed respectively at equal angular intervals in the circumferential direction of the thick-walled section.

5. The hydraulic antivibration device as set forth in claim 3, wherein each tip end of the first ribs and each tip end of the second ribs are situated radially inwardly of the inner peripheral margins of a plurality of the second openings.

6. The hydraulic antivibration device as set forth in claim 4, wherein a remotest top portion of the top ridges of the first ribs from the thick-walled section and a remotest top portion of the top ridges of the second ribs from the thick-walled section protrude outwardly of the thick-walled section in the thickness direction of the thick-walled section.

7. The hydraulic antivibration device as set forth in claim 1, wherein each of the first ribs and each of the second ribs are pinched and held by the pair of the displacement-regulating members.

8. The hydraulic antivibration device as set forth in claim 1, wherein each of the first ribs and each of the second ribs are, respectively, of a triangular shape in cross-section in the elongation direction, with the apex being each of the top ridges.

9. The hydraulic antivibration device as set forth in claim 1, wherein the first liquid chamber internally includes a stirring plate and an orifice on the first liquid chamber side defined between an outer peripheral margin of the stirring plate and an internal peripheral face of the first liquid chamber.

* * * * *